United States Patent Office.

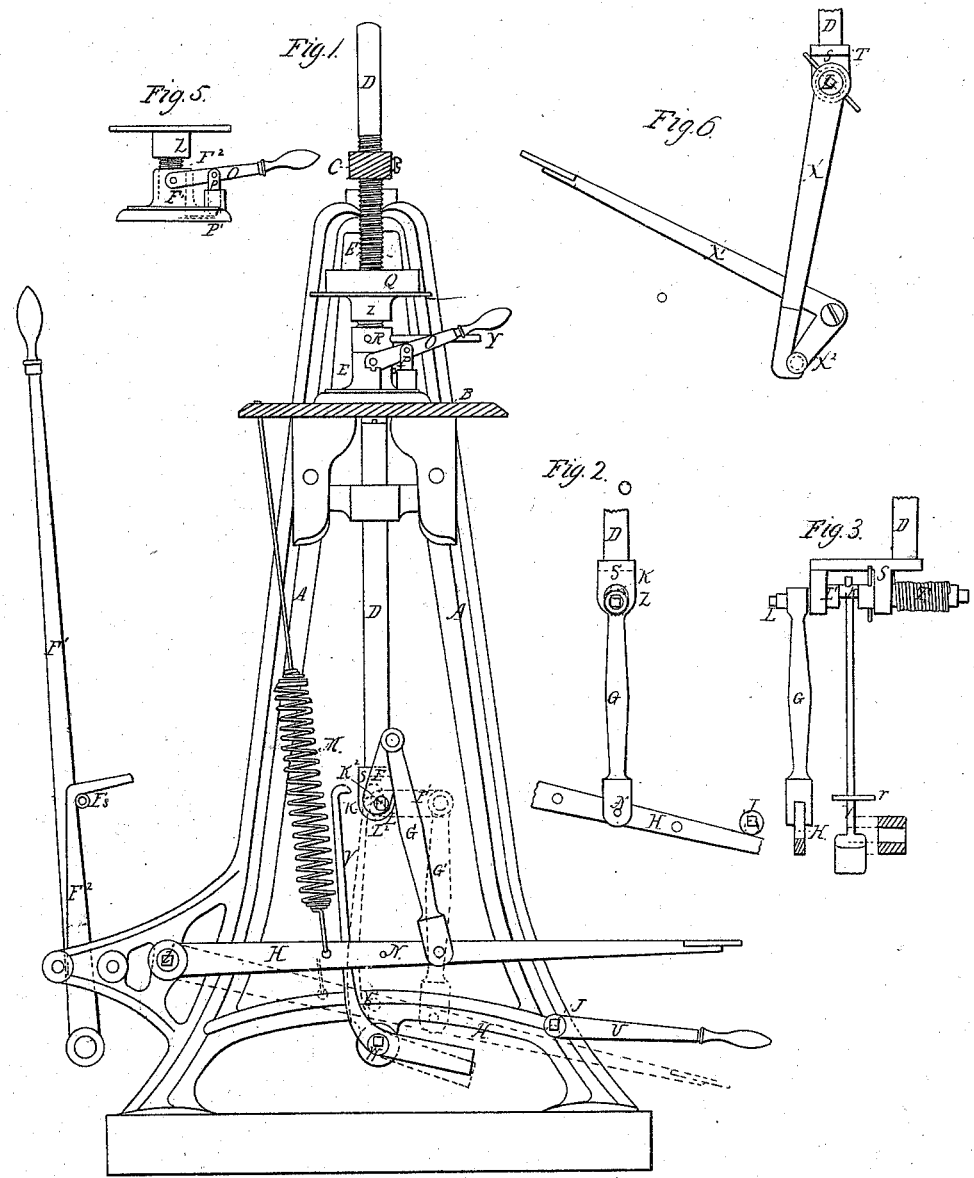

GEORGE C. HOWARD, OF PHILADELPHIA, PENNSYLVANIA.

Letters Patent No. 89,834, dated May 4, 1869; antedated November 4, 1868.

IMPROVEMENT IN HAT-PRESSES.

The Schedule referred to in these Letters Patent and making part of the same.

Be it known that I, GEORGE C. HOWARD, of Philadelphia, county of Philadelphia, and State of Pennsylvania, have invented certain new and useful Improvements in Presses for Forming Hats, Bonnets, &c.; and I do hereby declare that the following is a full, clear, and exact description of the construction and operation of the same, reference being had to the annexed drawings, making part of this specification, in which—

Figure 1 is a side view of the machine;

Figures 2, 3, 5, and 6, are various devices of which my improvements consist; and Figure 4 shows an arrangement which has been used to accomplish the same object as my improvements.

In presses used for the formation of hats, bonnets, and other similar articles, it is necessary to give to the moving mould, which is usually the upper one, an amount of motion greatly in excess of what is actually required for the compression and formation of the article, owing to the convexity of one mould entering into the concavity of the other, and to the fact, that the material is usually introduced in plain, flat sheets, which cannot be done until the top of the lower mould leaves space enough between the bottom of the upper mould, to introduce said sheet. As this movement requires a comparatively small amount of power, it is most conveniently done by the direct means of a treadle, H, figs. 1 and 2, but as soon as this is accomplished, and both moulds are in contact with the material, a more powerful pressure is desired, to obtain which, I have designed the different improvements.

The rod D, figs. 1, 2, 3, and 6, passes through the bearing in the frame A, and carries the upper cross-head C, which is provided with an adjustable screw, as shown at E, fig. 1, and its lower end carries the cross-head S, figs. 1, 2, 3, and 6, to which several of my improvements may be attached.

The improvement shown in fig. 1, consists of a crank, F, fastened to a crank-shaft, $L^2$; the small double crank K, in figs. 1, 2, and 3, being one piece with $L^2$, as shown in fig. 3.

A link, G, connects the crank F and treadle H.

The spiral spring T, on the crank-shaft $L^2$, is strong enough to keep the crank in its upper position, until the moulds are brought in contact with the material by bringing the treadle H to the position shown by full lines in fig. 1.

The latch V now catches the double crank K, figs. 1 and 3, which then acts as a fulcrum for the lever, or crank F, and any further depression of the treadle will give a pressure in proportion to the leverage of the treadle H, crank F, and double crank K.

At the completion of the last movement, the parts are in position as shown by dotted lines.

The spring T brings the crank to its original position, after the treadle H has been relaxed.

A modification of this appliance is shown in fig. 2, where the crank F and latch V are dispensed with. The link G is moved on the treadle to the pin-hole N, and its other eye is connected with the crank-pin L on the crank-shaft $L^2$.

In this case, the treadle H is brought down at once to the position shown by dotted lines in fig. 1, and being capable of a slight lateral motion, is pushed under the pin J, figs. 1 and 2.

The bearing of J in the frame A, being eccentric with the pin, it follows that on turning the pin in said bearing, by means of lever U, we depress the treadle H, and consequently the mould, proportionate to its amount of eccentricity.

The same effect will be produced by applying the lever U to the square shank on crank-pin L, which, on being turned, will produce a further depression of the rod D, the treadle being at the same time held by the pin J.

Another arrangement is shown in fig. 6, in which the rod D and cross-head S are depressed by means of the treadle H, to the position shown by full lines in fig. 1, at which point the latch X falls over the pin $X^2$, in the short arm of the bell-lever $X^1$.

When the treadle-arm is depressed to the pin $V^2$, the pin $X^2$ is brought into a straight line with the fulcrum of the lever $X^1$, and the rod D depressing the latter to an amount equal to the versed sine of the arc which the pin describes.

In fig. 1, is shown a method of producing the additional pressure, after the moulds are in contact, by means of the nut R, whose thread corresponds with that of the screw Z' fastened in the boss E.

By screwing the nut R against the platform Z, by means of the handle Y, Z rises, compressing powerfully any material that it may encounter in its ascent.

The last device for accomplishing my object, is shown partly in fig. 1, and isolated in fig. 5.

The platform C is in this case provided with a ram, $E^2$, passing into the boss, or cylinder $E^1$, and by forcing an incompressible fluid under said ram, by means of the lever O, plunger P, and channel P', a pressure is obtained proportionate to the areas of the ram and plunger.

Either of these devices may be used for any form of press employed for the purposes mentioned.

I do not claim as my invention the idea of applying the additional powerful pressure described in this specification; nor do I claim the particular devices shown in fig. 4; but

What I claim as my invention, and desire to secure by Letters Patent, is—

1. The combination of the link G, crank-arm F, and crank-shaft $L^2$, and spiral spring T, with the treadle H, substantially as and for the purposes specified.

2. The combination of link G, crank-pin L, and crank K, eccentric catch-pin J, and lever U, with the treadle H, substantially as and for the purpose set forth in this specification.

3. The combination of the latch X, bell-lever X¹, and pin X², with the treadle H, cross-head S, and link G, substantially as and for the purpose specified.

4. The arrangement of the hydraulic pump P and ram E², with the treadle H, catch or eccentric pin J, link G, cross-heads S and C, and guide-rod D, substantially as and for the purpose specified.

5. The arrangement of the nut R, handle Y, screw Z', and platform Z, with the treadle H, eccentric-pin J, link G, cross-heads S and C, fig. 1, substantially as and for the purpose set forth in this specification.

GEO. C. HOWARD.

Witnesses:
HARRY LIPPINCOTT,
L. M. BLANTON.